June 19, 1962  G. P. HERMANN ETAL  3,040,212
PROTECTED TRANSFORMER
Filed Sept. 26, 1957  2 Sheets-Sheet 1

Inventors,
Gerald P. Hermann,
Edward D. Treanor,
by Gilbert P. Tarleton
Their Attorney.

Inventors,
Gerald P. Hermann,
Edward D. Treanor,
by Gilbert P. Tarleton
Their Attorney.

United States Patent Office 3,040,212
Patented June 19, 1962

3,040,212
PROTECTED TRANSFORMER
Gerald P. Hermann, Pittsfield, Mass., and Edward D. Treanor, Athens, Ga., assignors to General Electric Company, a corporation of New York
Filed Sept. 26, 1957, Ser. No. 686,339
13 Claims. (Cl. 317—15)

This invention relates to transformers, and more particularly to protected voltage step down transformers for electrical distribution and transmission systems. By a protected transformer is meant a transformer having a circuit breaker and lightning arrester associated therewith for the purpose of protecting the transformer against overloads and lightning surges.

Protected transformers conventionally are placed inside a tank, and one way of protecting such transformers is to have a circuit breaker inside the transformer tank and a lightning arrester mounted outside the transformer tank. The circuit breaker is connected in the line lead between the grounded transformer primary winding and the transmission line or the source of electrical energy which energizes the transformer. The lightning arrester is also grounded and is connected ahead of the circuit breaker or between the circuit breaker and the line.

The circuit breaker is responsive to current and temperature in the transformer so that it will trip open at overcurrents or overtemperatures. The lightning arrester protects the transformer from lightning surges by providing a parallel path to ground for lightning surges. After a lightning surge is dissipated to ground the arrester will seal off the power follow current to ground within one-half cycle of 60 cycle power current if the arrester is in good condition. However, if the lightning arrester fails to seal off the power follow current to ground this will not be accomplished by the circuit breaker. This is because the circuit breaker is connected to the line behind the lightning arrester and therefore it does not see or detect the power follow current to ground.

Therefore, lightning arresters have been provided with isolators to disconnect the lightning arrester from ground in the event it fails to seal off power follow current. One form of lightning arrester isolator comprises a charge of explosive which will withstand the lightning surge and one or two half cycles of 60 cycle power follow current. If the lightning arrester fails to seal off the power follow current within one or two half cycles then the explosive will be exploded to disconnect the ground lead from the lightning arrester. However, after the lightning arrester is isolated from ground the transformer is without protection from lightning surges until a new lightning arrester can be installed.

Additional disadvantages of the above-described protected transformer are that the lightning arrester which is mounted on the outside of the transformer tank does not give the transformer a pleasing appearance, and the externally mounted arrester may be broken during handling and shipment of the transformer. Also, the externally mounted lightning arrester may interfere with mounting of the transformer on a line pole or the like and it may conflict with location of the transformer bushings and leads.

Attempts have been made in the past to position the lightning arrester inside the transformer tank. However, these attempts have not been satisfactory for several reasons. One reason is that an explosive lightning arrester isolator may cause serious damage to the transformer and blow off the transformer tank cover. Therefore, it has been proposed to omit the lightning arrester isolator when the lightning arrester is internally mounted. When this expedient is followed a main circuit breaker back in the line is relied upon to take the transformer and arrester off the line if the arrester fails to seal off the power follow current. However, this arrangement results in a service interruption at many transformers besides the one with the faulty lightning arrester. This is because the line may have many sections or branches connected thereto and when the circuit breaker back in the line trips open all the transformers on these sections or branches are de-energized. Furthermore, in such an expedient it is time consuming to locate the place of the fault. One procedure is to close the main circuit breaker and energize each transformer one at a time. However, when this is done the service interruption at many transformers is prolonged since the place of fault may not be located immediately.

Another form of isolator for externally mounted lightning arresters has taken the form of an external gap in series with the lightning arrester. If such an isolator is placed inside the transformer tank with the lightning arrester it may generate explosive pressures in the transformer oil and damage the transformer and blow off the tank cover. If the external series gap is retained outside the tank and the lightning arrester is placed inside the tank then special equipment is required as, for instance, a separate bushing for the external series gap. If the series gap is enclosed and placed inside the tank difficult design problems are encountered and special equipment is still required.

Additionally, whether the series gap is mounted internally or externally it will not of itself interrupt the power follow current through a defective lightning arrester. Instead, power follow current persists until it is interrupted by a main circuit breaker back in the line. Opening and reclosing of the main circuit breaker causes a momentary interruption in service in the various branches but the arc across the series gap is not restruck after the main circuit breaker is reclosed. The transformer is not left unprotected since a parallel path to ground through the faulty lightning arrester is still provided. Nevertheless, this manner of interrupting the power follow current does not give a visual indication of where in the whole line the fault resides as in the case of an explosive external isolator which disconnects the ground lead of the lightning arrester. Also, the main circuit breaker will be tripped open again during a subsequent lightning surge unless the faulty lightning arrester is replaced, and the faulty lightning arrester is difficult to locate unless it is provided with means to indicate its faulty condition.

Attempts have been made in the past to internally mount the lightning arrester behind an externally mounted fuse. The lightning arrester did not have an isolator and it may have been intended that the fuse serve the function of a lightning arrester isolator as well as the function of a conventional transformer circuit breaker. However, this has not been satisfactory for several reasons. If the fuse is to serve the function of the conventional transformer circuit breaker it must be able to fuse at a fairly low current, say of the order of 7 amperes in a 10 kva., 7200 volt transformer. However, if this same fuse is to be capable of withstanding lightning surges and one or two half cycles of power follow current its rating must be increased, say to the order of 50 amperes. That is, the requirements of these two functions are in opposition to each other. Of course, if the fuse is uprated to 50 amperes the transformer will not be protected against excessive overloads and minor internal or external faults which result in 7 to 50 amperes of current since the fuse will not melt at this range of current.

The fuse can be designed to be insensitive to lightning surges and one or two half cycles of power follow current but sensitive to the above-mentioned range of current. This can be accomplished by placing an inductance in series with the fuse and shunting the inductance and fuse with a spark gap. However, here again special equipment is required. Additionally, if the fuse inductance and spark gap is to be mounted inside the transformer tank these parts may need to be enclosed. This is because an exposed lightning surge arc across the spark gap may generate explosive pressures or have a deleterious effect on the oil of an oil-filled transformer. A further reason for not putting a fuse inside the tank is that it is much easier to provide for renewing the fuse if it is located outside the tank.

It is an object of the invention to provide an improved protected transformer which will overcome the heretofore discussed disadvantages.

It is a further object of this invention to provide an improved circuit breaker and lightning arrester combination for protecting electrical apparatus.

Another object of the invention is to provide an improved circuit breaker for protecting electrical apparatus.

In one form of our invention a circuit breaker is connected in a primary lead of a transformer. Connected to this same primary lead behind or inside of the circuit breaker is a grounded lightning arrested. That is, the grounded lightning arrester is connected to the primary lead between the circuit breaker and the primary coil. The circuit breaker is capable of discriminating between lightning surges plus one or two half cycles of 60 cycle power follow current to ground and overcurrents in the primary coil as well as power follow current of longer duration than one or two half cycles. That is, the circuit breaker will stay closed during lightning surges and one or two half cycles of power follow current. However, if the lightning arrester fails to interrupt power follow current to ground or if excess current develops in the primary coil the circuit breaker will automatically trip open.

By excess current in the primary coil is meant a current which is several times rated primary current and lasts for longer than the period normally required by the lightning arrester to clear power follow current to ground and which may do damage to the transformer or appreciably shorten its expected life if not interrupted. For instance, in a 10 kva., 7200 volt, 1.4 ampere rated transformer an insulation failure in the primary or secondary coil may result in a sustained primary current of say 7 or more amperes which is several times rated primary current and excessive. Such an excessive primary current can also be caused by undesirable conditions outside the transformer but which are still part of the transformer system. Thus, the secondary or customers' lines may become twisted together.

Momentary excessive primary currents are not treated as transformer system faults. For instance, if the secondary lines momentarily touch each other there may be a momentary excessive primary current. However, since the excessive primary current is not sustained it is not looked upon as being a primary fault current to be guarded against.

Lightning arrester power follow current to ground may be several times rated primary current. If the lightning arrester is functioning properly power follow current will not be sustained but will be interrupted within 1 or 2 half cycles of 60 cycle current. However, if power follow current is not interrupted by the arrester then the circuit breaker will trip open. Excess primary currents which last for less than the time normally required by a lightning arrester to interrupt power follow current are not looked upon as being primary fault currents. Otherwise the circuit breaker would trip open before the lightning arrester had an opportunity to clear the power follow current.

Excessive loading of the transformer can also cause excessive primary currents. Operating a transformer for sustained periods at several times rated load will appreciably decrease its expected life.

The subject matter which we regard as our invention is particularly pointed out and distinctly claimed in the concluding portion of the specification. Our invention, however, both as to its organization and method of operation, together with further objects and advantages thereof, may best be understood by reference to the following description taken in connection with the accompanying drawings, in which:

Figure 1:
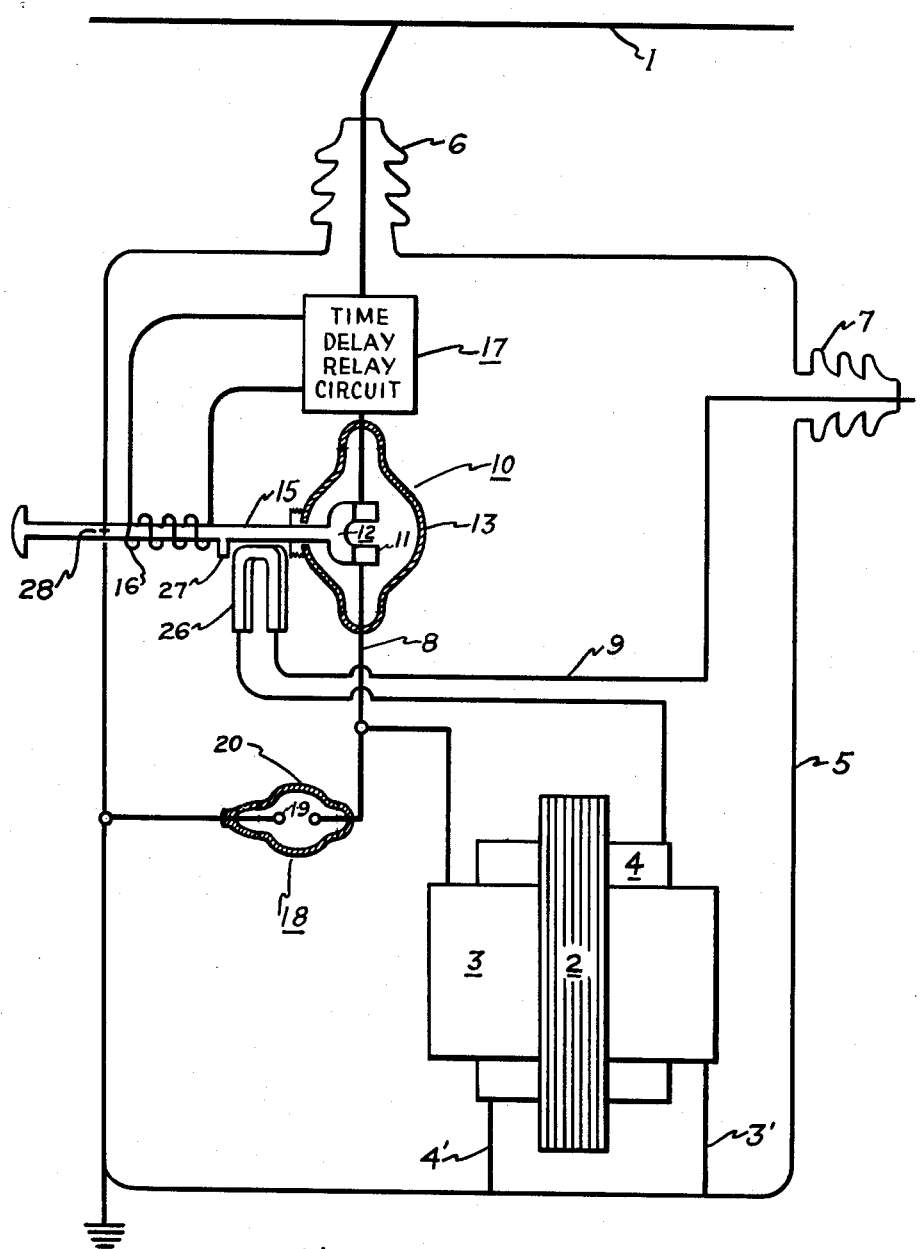
FIG. 1 is a diagrammatic illustration of one form of our invention.

In FIG. 1 of the drawings is illustrated an electrical distribution transformer which is being utilized to transform high voltage electrical energy from a transmission line 1 to another voltage for customer use. The transformer comprises a core 2 and linked primary and secondary coils 3 and 4 respectively. The transformer is enclosed in a main tank 5 which may be oil or gas filled or vented to the atmosphere. The tank has primary and secondary bushings 6 and 7 respectively. The invention is usable with multiple or single phase transformers and FIG. 1 illustrates the arrangement for a single phase transformer or one phase of a multiple phase transformer.

Primary and secondary leads 8 and 9 connect the primary and secondary coils 3 and 4 respectively to the primary and secondary bushings 6 and 7 respectively. The opposite ends of coils 3 and 4 are illustrated as being grounded. This may be accomplished by grounding tank 5 and connecting leads 3' and 4' of coils 3 and 4 respectively to grounded tank 5. However, it will be appreciated by those skilled in the art that the tank does not have to be grounded but the coils can be connected to ground by connecting leads 3' and 4' to grounded bushings. Also, the primary coil does not have to be grounded. For instance, it is well known to connect the other end of the primary coil to another line. Of course, if this is done then the other end of the coil should also be provided with our improved circuit breaker and lightning arrester protective combination to give complete protection to the transformer.

A circuit breaker 10 is connected in the primary lead 8 between the line 1 and primary coil 3. The circuit breaker 10 may comprise fixed contacts 11 and a movable contact 12. If the illustrated transformer is a step down distribution transformer the primary side is the high voltage side. When high voltage primary fault currents are to be interrupted by the breaker 10 we prefer that the breaker 10 be a vacuum breaker. By a vacuum circuit breaker is meant a circuit breaker whose contacts operate in a vacuum. Accordingly, the contacts 11 and 12 are illustrated as being enclosed in an evacuated envelope 13. A vacuum circuit breaker is preferred for high voltages because it will be smaller in size than other forms of circuit breakers which have similar ratings. It will be appreciated that in distribution transformers of the line pole type the circuit breakers should be as small as possible to economize on weight and space.

The movable contact 12 preferably can be opened and closed manually by an operating member 15 which extends outside the tank 5. The movable contact 12 is also automatically tripped open in response to excess currents in the primary coil 3 and power follow currents which have a duration of more than one or two half cycles of 60 cycle current. The means for accomplishing this is a relay coil 16 of a time delay relay circuit indicated generally in FIG. 1 by the reference numeral 17 and illustrated in greater detail in FIG. 2.

Connected behind or inside the breaker 10 is a grounded lightning arrester 18. The lightning arrester 18 preferably is a vacuum lightning arrester to economize on weight and space. Vacuum lightning arresters can be made much smaller than other forms of lightning arresters having the same rating and by a vacuum lightning arrester is meant a lightning arrester whose arc gap is enclosed in a vacuum. This is illustrated in FIG. 1 by the spaced electrodes 19 which are enclosed in a vacuum envelope 20. One of the electrodes 19 is connected to the primary lead 8 between the breaker 10 and primary coil 3, and the arrester is grounded by connecting its other electrode 19 to the grounded tank 5, or a separate ground connection can be provided if the tank 5 is not grounded. A non-linear resistor element may be employed in series with the arrester 18 if so desired. This is commonly done to limit the power follow current.

Vacuum circuit breakers and lightning arresters can be made much smaller than other forms of interrupters since a gap in vacuum will seal off the current at current zero whereas the same gap in air will need assistance from means such as magnetic or gas generating devices to elongate and blow out the arc and the air gap may also need to be made larger. Space considerations in transformers are very important since in actual practice there is very little room inside a transformer tank for protective apparatus. Additionally, gas blast interrupters pose special problems if they are placed inside the transformer tank since they may have to be vented to the atmosphere.

When lightning strikes the line 1 the surge will pass to ground through the breaker 10 and arrester 18. The time delay relay circuit 17 which is the tripping means for the breaker 10 is capable of withstanding the lightning surge and one or two half cycles of 60 cycle power follow current. By this is meant that the means 17 and relay 16 will not be damaged or tripped open by a lightning surge or one or two half cycles of 60 cycle power follow current. If the arrester 18 is functioning properly it will interrupt the arc across electrodes 19 within one or two half cycles of power follow current. The time delay relay circuit will not trip the breaker open during this normal period of power follow current flow. However, if the arrester fails to interrupt power follow current then the time delay relay circuit 17 will automatically trip the breaker 10 open.

Figure 2:
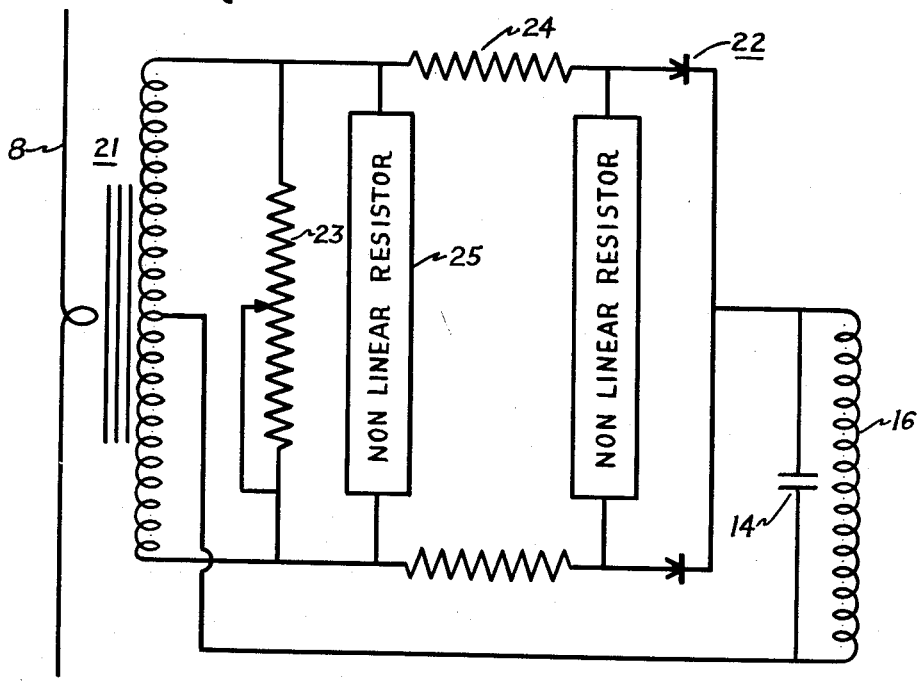
FIG. 2 is a diagrammatic electrical circuit of the time delay relay means for the circuit breaker of FIG. 1.

Referring now to FIG. 2, the time delay relay circuit for the breaker 10 comprises a saturable iron core current transformer 21. The primary lead 8 may have one or more turns formed therein and constitute the primary side of current transformer 21. The secondary of the current transformer 21 is center tapped and the relay coil 16 is connected to the center tap and the opposite ends of the current transformer secondary through a pair of rectifiers 22. The amount of time delay can be controlled by means such as a capacitor 14 connected in parallel with the relay coil 16 since the capacitor 14 must be charged before the relay coil can be energized. A tapped adjusting resistor 23 is connected across the secondary of the current transformer for shunting part of the secondary current, thereby enabling adjustment of the primary current through lead 8 necessary to energize the relay coil 16 and trip the breaker 10. The secondary of the current transformer also has a surge protector or filter for the rectifiers 22. The surge protector or filter comprises a pair of linear resistors 24 and a pair of non-linear resistors 25. The non-linear resistors 25 are connected across the secondary and the linear resistors 24 are connected in the secondary leads between the non-linear resistors 25. The secondary does not necessarily have to be center tapped and the opposite ends of the relay coil could be connected to the opposite ends of the secondary through a bridge rectifier. However, the center tap and pair of rectifiers is preferred since the non-linear resistors 25 work better with higher voltages and fewer rectifiers are used than with a bridge rectifier.

Figure 3:
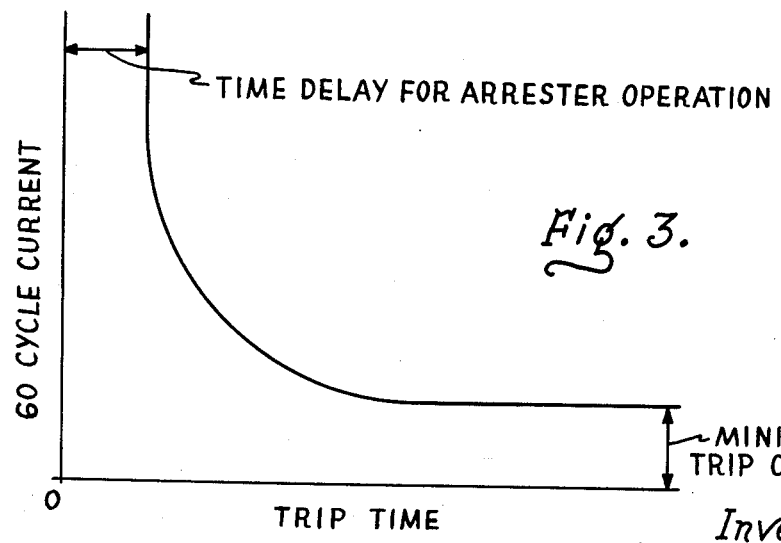
FIG. 3 is a trip time vs. 60 cycle currrent curve for the relay circuit of FIG. 2.

The current transformer is designed to saturate somewhat above the minimum trip current level so that with increasing 60 cycle current the secondary of the saturated current transformer tends to provide a constant average secondary voltage output resulting in an essentially constant time delay. The 60 cycle current vs. trip time curve for the relay circuit is indicated in FIG. 3. The time delay is more than one or two half cycles of power follow current so that the arrester 18 will have a chance to seal off the power follow current through the breaker 10 and arrester 18 to ground before the breaker trips open. The circuit breaker trip means of FIG. 2 will not trip open on impulse currents such as lightning strokes and also will not be damaged by impulse currents. For instance, the circuit of FIG. 2 can withstand surges of 95,000 amperes following which it will trip open after more than one or two half cycles of 60 cycle power follow current of about 7 or more amperes. Thus, in our invention the breaker 10 will function as an isolator for the arrester 18 and will also trip open on excessive overloads or sustained faults in the transformer windings or transformer secondary circuit. With this type of tripping means the breaker will respond properly to a very widely varying short circuit current from the beginning to the end of a long transmission line.

In our invention we prefer to make breaker 10 also responsive to long time secondary overcurrents and transformer overtemperatures which are not high enough to cause relay 16 to operate but if sustained will burn out the transformer. This can be accomplished by connecting a thermally and electrically responsive element such as bimetallic element 26 in the secondary lead 9. If there is a fault in the secondary circuit the resultant overcurrent will cause the bimetallic element 26 to deflect to the left to strike a tab 27 on the operating member 15 to open the contact 12. If the transformer is oil filled the bimetallic element 26 is submerged in the oil and therefore thermally responsive to gradual overloading of the transformer.

The elements 16 and 26 for tripping the breaker open are shown as operating directly on the contact 12. However, it will be appreciated by those skilled in the art that in normal practice the elements 16 and 26 would be connected to contact 12 by means such as a mechanical trip linkage so that very low trip forces could trip the breaker open. It is also normal practice to make such mechanical linkage trip free so that the breaker cannot be held closed during a fault or overload.

Our breaker 10 will also give an indication or signal as to whether it is open or closed. The indicating or signal means is illustrated as comprising a mark 28 on the circuit breaker operating member 15. This mark will be exposed when the breaker 10 is tripped open. Since the breaker is tripped open if the arrester 18 fails to interrupt power follow current the mark 28 also serves as a means for indicating the condition of the arrester 18.

While there has been shown and described a particular embodiment of the invention, it will be obvious to those skilled in the art that changes and modifications may be made without departing from the invention, and therefore, it is intended by the appended claims to cover all such changes and modifications as fall within the true spirit and scope of the invention.

What we claim as new and desire to secure by Letters Patent of the United States is:

1. In combination, electrical translating apparatus which is subject to overloads and lightning surges and which is provided with a line terminal, a circuit breaker which is electrically connected to said line terminal and in series with said apparatus, a grounded lightning arrester which is electrically connected to said line terminal between said circuit breaker and apparatus, said circuit breaker having a pair of separable contacts and means for automatically opening said contacts, said means being responsive to overcurrents in said apparatus and failure of said lightning arrester to interrupt power follow current to ground, and said means being capable of withstanding lightning surges and normal power follow current, and thermally responsive means for automatically opening said contacts, said thermally responsive means being responsive to overtemperatures in said apparatus.

2. In the combination of claim 1, wherein said means comprises a saturable iron core current transformer having a primary coil and a secondary coil, said primary coil being responsive to overcurrents in said apparatus, said secondary coil having a time delay relay coil connected thereto through rectifier means, a surge protector for said rectifier means, and means for adjusting the amount of current through said primary coil necessary to energize said relay coil.

3. In combination, electrical translating apparatus which is subject to overloads and lightning surges and which is provided with a line terminal, a circuit breaker which is electrically connected to said line terminal and in series with said apparatus, a grounded lightning arrester which is electrically connected to said line terminal between said circuit breaker and apparatus, said circuit breaker having a pair of separable contacts and means for automatically opening said contacts, said means being responsive to overcurrents in said apparatus and failure of said lightning arrester to interrupt power follow current to ground, said means being capable of withstanding lightning surges and normal power follow current, said means comprising a saturable iron core current transformer having a primary and secondary coil, said primary coil being responsive to overcurrents in said apparatus, said secondary coil having a time delay relay coil connected thereto through rectifier means, a surge protector for said rectifier means, and means for adjusting the amount of current through said primary coil necessary to energize said relay coil, and thermally responsive means for automatically opening said contacts, said thermally responsive means being responsive to overtemperatures in said apparatus, and means for manually opening and closing said contacts.

4. A time delay tripping means for a circuit breaker, said means comprising a saturable iron core current transformer having a primary and secondary coil, a time delay relay coil which is connected to said secondary coil through rectifier means, a surge protector for said rectifier means, and means for adjusting the amount of current through said primary coil necessary to energize said relay coil, said primary coil being responsive to current through said circuit breaker.

5. A time delay relay means comprising a saturable iron core current transformer having a relay coil which is connected to the secondary coil of said current transformer through rectifier means, a capacitor which is connected in parallel with said relay coil, a surge protector for said rectifier means, and means for adjusting the amount of current through the primary coil of said current transformer necessary to energize said relay coil.

6. In combination, electrical translating apparatus which is subject to overloads and lighting surges and which is provided with a line terminal, a circuit breaker which is electrically connected to said line terminal in series with said apparatus, a grounded lighting arrester which is electrically connected to said line terminal between said circuit breaker and said apparatus, said arrester comprising a pair of spaced electrodes which define an arc gap which is enclosed in a vacuum, said circuit breaker having separable contacts and means for automatically opening said contacts, said means being responsive to overcurrents in said apparatus and failure of said lighting arrester to interrupt power follow current to ground, said means being capable of withstanding lightning surges and normal power follow current, said apparatus being housed in a casing, and said lighting arrester, circuit breaker and means being located in said casing, said contacts being enclosed in a vacuum, and means being provided for manually opening and closing said contacts from outside said casing.

7. In the combination of claim 6, wherein means is provided for automatically indicating from outside said casing whether said contacts are open or closed.

8. In the combination of claim 6, wherein thermally responsive means is provided inside said casing for automatically opening said contacts, said thermally responsive means being responsive to overtemperatures in said apparatus.

9. In a transformer having a primary winding which is grounded at one end thereof and provided with a line terminal at the other end thereof, a manually and automatically operable fuseless circuit breaker having separable contacts connected in series with said winding at said other end, a grounded lightning arrester connected in parallel with said winding between said winding and said circuit breaker, said circuit breaker being provided with means to automatically open said contacts, said means being adapted to withstand lightning surges and normal power follow current to ground and trip open said contacts in response to overcurrents in said winding and failure of said lighting arrester to interrupt power follow current, and thermally responsive means for automatically opening said contacts, said thermally responsive means being responsive to overtemperatures in said transformer.

10. In a transformer having a primary winding which is grounded at one end thereof and provided with a line terminal at the other end thereof, a manually and automatically operable fuseless vacuum circuit breaker connected in series with said winding at said other end, a grounded vacuum lighting arrester connected in parallel with said winding between said winding and said circuit breaker, said circuit breaker being provided with means to automatically operate said circuit breaker, said means being adapted to withstand lightning surges and normal power follow current to ground and trip open said circuit breaker in response to overcurrents in said winding and failure of said lightning arrester to interrupt power follow current, and thermally responsive means for automatically opening said circuit breaker, said thermally responsive means being responsive to over-temperatures in said transformer.

11. In a transformer having a primary winding which is grounded at one end thereof and provided with a line terminal at the other end thereof, a manually and automatically operable fuseless vacuum circuit breaker connected in series with said winding at said other end, a grounded vacuum lightning arrester connected in parallel with said winding between said winding and said circuit breaker, said circuit breaker being provided with means to automatically operate said circuit breaker, said means being adapted to withstand lightning surges and normal power follow current to ground and trip open said circuit breaker in response to overcurrents in said winding and failure of said lightning arrester to interrupt power follow current, and said transformer, breaker and arrester being housed in a transformer tank.

12. In a transformer having a primary winding which is grounded at one end thereof and provided with a line terminal at the other end thereof, a manually and automatically operable fuseless vacuum circuit breaker connected in series with said winding at said other end, a grounded vacuum lightning arrester connected in parallel with said winding between said winding and said circuit breaker, said circuit breaker being provided with means to automatically operate said circuit breaker, said means being adapted to withstand lightning surges and normal power follow current to ground and trip open said circuit breaker in response to overcurrents in said winding and failure of said lighting arrester to interrupt power follow current, said transformer, breaker and arrester being housed in a transformer tank, means for manually opening and closing said breaker from outside said tank, and automatically operable means for indicating from outside said tank whether said breaker is open or closed.

13. In a transformer having a primary winding which is grounded at one end thereof and is provided with a line lead at the other end thereof, a manually and automatically operable fuseless circuit breaker having separable contacts connected in series with said winding in said line lead, a grounded lightning arrester connected in parallel with said winding between said winding and said circuit breaker, said circuit breaker being adapted to withstand lighting surges and normal power follow current to ground and trip open in response to overcurrents in said winding and failure of said lightning arrester to interrupt power follow current, said circuit breaker having time delay tripping means comprising a saturable iron core current transformer whose primary winding is provided by said primary lead, a time delay relay coil which is electrically connected to the secondary winding of said current transformer through rectifier means, a surge protector for said rectifier means, and means for adjusting the amount of current through said primary lead necessary to energize said relay coil.

References Cited in the file of this patent

UNITED STATES PATENTS

| | | |
|---|---|---|
| 1,325,889 | Curtis | Dec. 23, 1919 |
| 1,750,771 | Austin | Mar. 18, 1930 |
| 1,844,403 | Leblanc | Feb. 9, 1932 |
| 1,960,068 | Ruppel | May 22, 1934 |
| 1,988,683 | Diehl | Jan. 22, 1935 |
| 2,066,935 | Hodnette | Jan. 5, 1937 |
| 2,182,637 | Marbury | Dec. 5, 1939 |
| 2,236,981 | Winter | Apr. 1, 1941 |
| 2,491,338 | Smith | Dec. 13, 1949 |
| 2,921,241 | McFarland | Jan. 12, 1960 |

FOREIGN PATENTS

| | | |
|---|---|---|
| 482,155 | Great Britain | Mar. 24, 1938 |